(12) United States Patent
Workman

(10) Patent No.: US 6,464,180 B2
(45) Date of Patent: Oct. 15, 2002

(54) PIPE ATTACHING APPARATUS

(75) Inventor: David E. Workman, Issaquah, WA (US)

(73) Assignee: 3 North Technologies, LLC, Chelmsford, MA (US)

( * ) Notice: Subject to any disclaimer, the term of this patent is extended or adjusted under 35 U.S.C. 154(b) by 0 days.

(21) Appl. No.: 09/886,733

(22) Filed: Jun. 22, 2001

(65) Prior Publication Data

US 2002/0000498 A1 Jan. 3, 2002

Related U.S. Application Data

(60) Provisional application No. 60/213,133, filed on Jun. 22, 2000.

(51) Int. Cl.⁷ ................................................. F16L 3/00
(52) U.S. Cl. ..................... 248/62; 248/74.1; 248/229.13
(58) Field of Search .......................... 248/62, 72, 74.1, 248/229.13, 229.23, 228.5, 228.1

(56) References Cited

U.S. PATENT DOCUMENTS

| 2,375,513 A | 5/1945 | Bach |
| 2,863,625 A | 12/1958 | Attwood |
| 3,042,352 A | 7/1962 | Stamper .................... 248/68.1 |
| 3,152,827 A | 10/1964 | Shebanow |
| 3,185,419 A | 5/1965 | Kindorf ........................ 248/73 |
| 3,226,069 A | 12/1965 | Clarke ......................... 248/73 |
| 3,463,428 A | 8/1969 | Kindorf et al. |
| 3,486,726 A | 12/1969 | Kindorf et al. |
| 3,522,921 A | 8/1970 | Lytle |
| 3,527,432 A | 9/1970 | Lytle |
| 3,532,311 A | 10/1970 | Havener |
| 3,547,385 A | 12/1970 | Kindorf et al. ................ 248/62 |
| 3,650,499 A | 3/1972 | Biggane ....................... 248/62 |
| 3,721,412 A | 3/1973 | Kindorf ........................ 248/73 |
| 4,157,800 A | 6/1979 | Senter et al. .................. 248/72 |
| 4,199,285 A | 4/1980 | Bader et al. |
| 4,516,296 A | 5/1985 | Sherman ................ 248/74.1 X |
| 4,662,590 A | 5/1987 | Hungerford, Jr. ............. 248/72 |
| 4,961,553 A | 10/1990 | Todd ............................ 248/62 |
| 5,022,614 A | 6/1991 | Rinderer ....................... 248/62 |
| 5,984,243 A | 11/1999 | Pfaller et al. .............. 248/74.1 |
| 6,234,277 B1 * | 5/2001 | Kaczmareck .......... 248/74.1 X |

FOREIGN PATENT DOCUMENTS

| CA | 624860 | 8/1961 |
| CH | 318370 | 2/1957 |

OTHER PUBLICATIONS

318370

* cited by examiner

Primary Examiner—Ramon O. Ramirez
(74) Attorney, Agent, or Firm—Woodbridge & Associates, P.C.; Richard C. Woodbridge

(57) ABSTRACT

A pipe attaching apparatus is used to attach pipe, electrical conduit and the like to a channel support without the use of tools. With one hand, an installer holds the apparatus containing a pipe between two clamp halves, squeezes a pair of base plates together, inserts a pair of hooks into a support channel and releases the base plates so that the hooks engage inturned flanges in the support channel. Using the same hand, the installer locks the apparatus by engaging a pair of locking pins on a cam in holes in the base plates. The cam in a locked position gives a visual indication of successful installation.

5 Claims, 4 Drawing Sheets

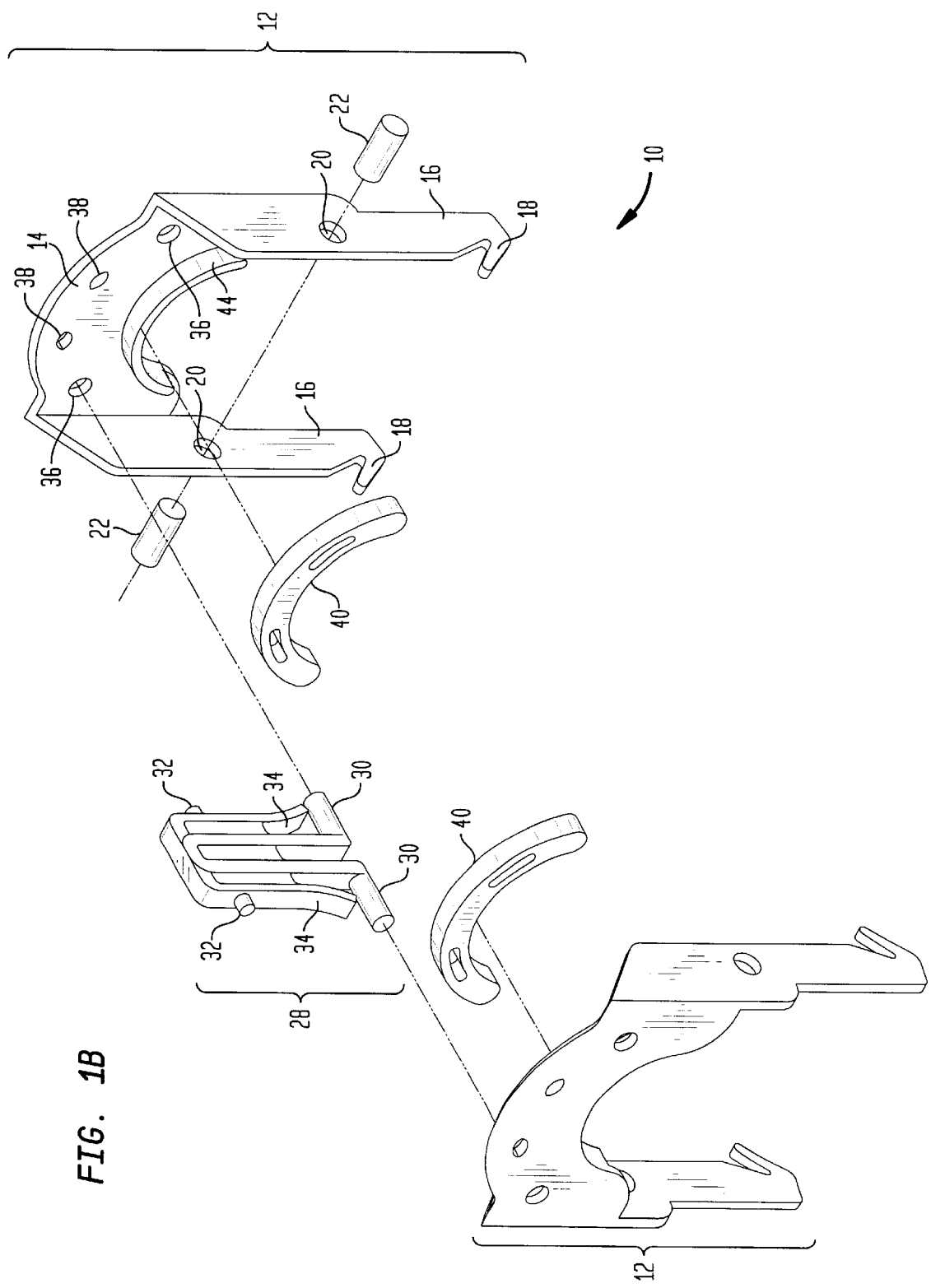

PIPE ATTACHING APPARATUS

CROSS REFERENCE TO RELATED APPLICATIONS

This application claims the priority of provisional U.S. application Ser. No. 60/213,133 filed on Jun. 22, 2000 and entitled "Pipe Attaching Apparatus" by David E. Workman, the entire contents and substance of which are hereby incorporated in total by reference.

BACKGROUND OF THE INVENTION

1. Field of the Invention

This invention relates to an apparatus for attaching pipes, electrical conduit and the like.

2. Description of Related Art

Clamps accepted as standard in the construction industry today for installing pipes and electrical conduit are typically inserted into a support channel and secured by means of a screw or bolt. An example of such a device is marketed by Unistrut Corporation of Wayne, Mich. One problem with such bolt or screw type clamps is that an installer must manipulate the clamp to insert each of its hook ends into a channel support while lining up the opposite ends of the clamp to receive a bolt. An installer must perform this operation around the pipe, frequently while holding the pipe. A nut must be threaded onto the end of the bolt, requiring the use of either a screwdriver and pliers, or a pair of wrenches. This process is awkward and time-consuming, and is difficult to perform in locations having poor accessibility. An experienced installer requires 30–60 seconds to complete the process for each clamp.

A number of solutions have been proposed in the prior art, three representative examples of which follow. Lytle, in U.S. Pat. No. 3,522,921 describes a clamp having clamping plates which are pre-assembled so that when placed over a pipe, opposite plates slant edgewise in opposite directions so that hooks engage opposite support flanges when inserted between the flanges. The operator must thereafter secure the securing end of the assembly by a wrench or screwdriver. Kindorf, in U.S. Pat. No. 3,185,419, discloses a pipe hanger which requires no special tools. Installation does, however, require twisting of hooks by force with pliers, various types of wrenches, the claw of a hammer, or a straight tool such as a chisel or screwdriver to force the clamp into engagement and hold this pipe. Denter et al., in U.S. Pat. No. 4,157,800 describes a pipe clamp with strapping means which enables a plumber or electrician to mount a pipe in a support channel by force with the use of pliers. U.S. Pat. Nos. 2,863,625, 3,522,921, 3,185,419, 3,532,311, 4,199,285, 4,157,800, Swiss Patent No. 318,370 and Canadian Patent No. 624,860 describe a number of different pipe clamps for use with supports and indicate the general status of the art. The following patents are of possible significance but lesser relevance:

U.S. Pat. Nos. 3,547,385, 2,375,513, 3,042,352, 3,226,069, 3,463,428, 3,486,726, 3,527,432, 3,650,499, 3,721,412, 4,516,296, 4,662,590, 4,961,533, 5,022,614, 5,984,243, and 3,152,827. Although such inventions have as their goal the simplification of the process of installation, all require the use of tools and the exertion of relatively substantial force.

As is evident from the foregoing analysis, there is a significant need for an apparatus which allows for rapid and easy installation of pipes without the use of tools.

SUMMARY OF THE INVENTION

Briefly described, the present invention comprises an apparatus for attaching pipe, electrical conduit and the like to a support. Installation of pipe is accomplished rapidly and easily by an installer with one hand without the use of any tools. The apparatus has a pair of pivotally mounted members which hold a pipe during installation. The apparatus also has a means for flexing the pivotally mounted members so that they can be inserted into and engaged by the structural support. Finally, locking means are provided so that the apparatus can be quickly and easily locked after the pivotally mounted members have been engaged by the structural support.

The invention may be more fully understood by reference to the following drawings.

BRIEF DESCRIPTION OF THE DRAWINGS

FIG. 1b an exploded view of the apparatus of FIG. 1a.

DETAILED DESCRIPTION OF PREFERRED EMBODIMENT

During the course of this description like numbers will be used to identify like elements according to the different views that illustrate the invention.

Figure 1A:
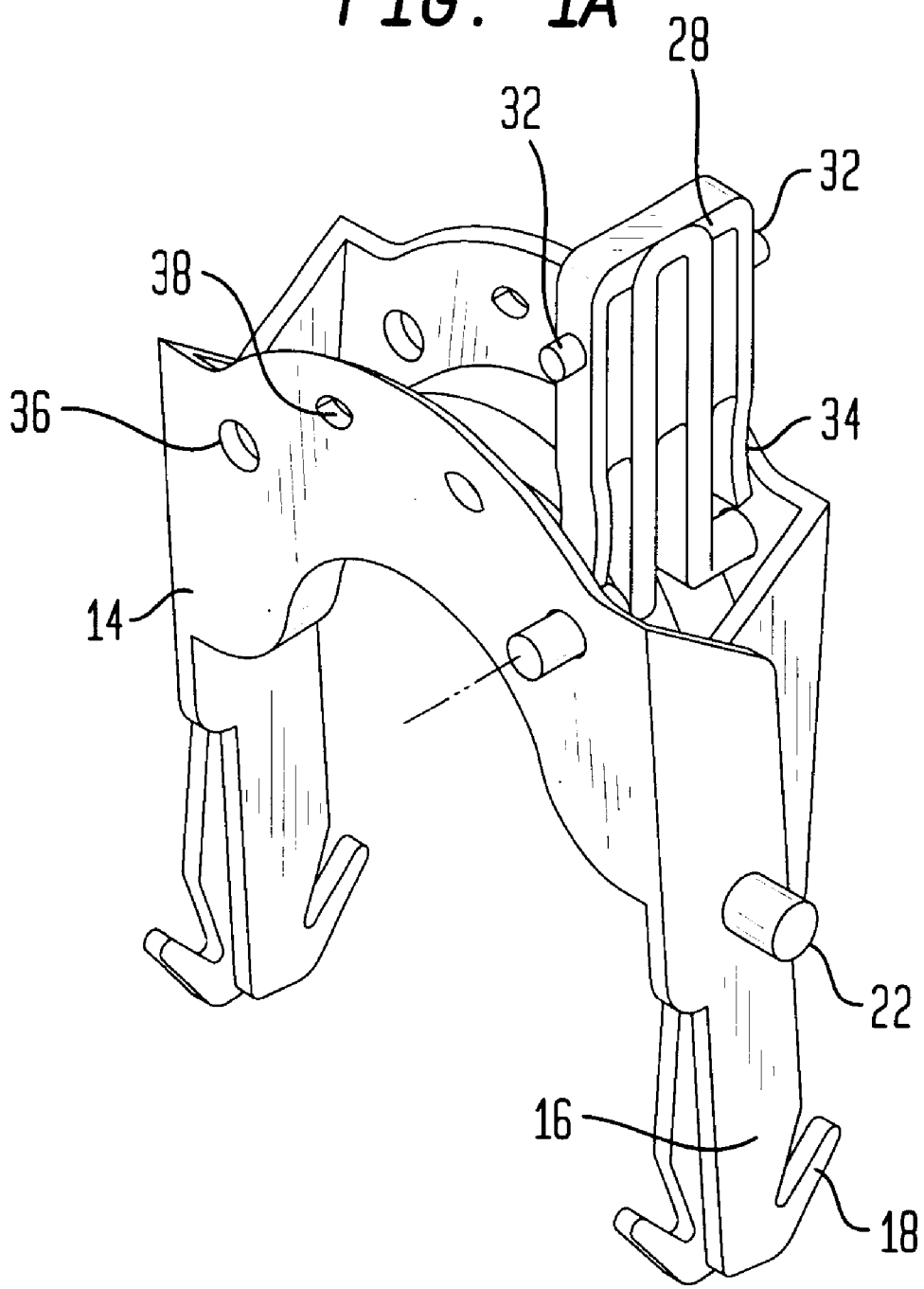
FIG. 1a illustrates the preferred embodiment of the present invention.
Figure 2A:
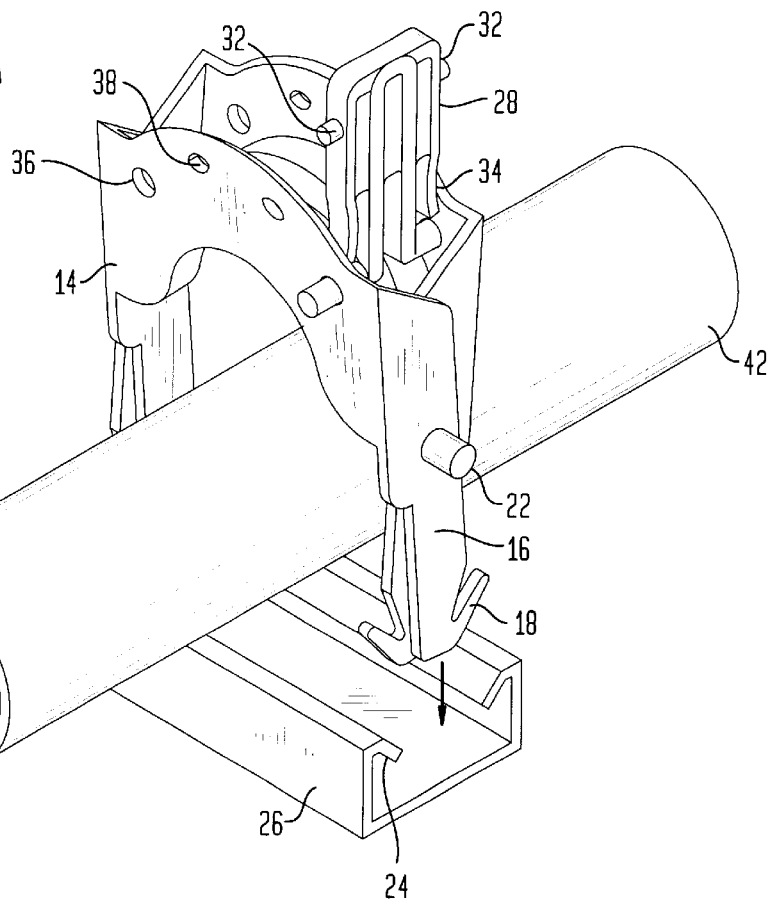
FIG. 2a illustrates the fully assembled apparatus of FIG. 1 with the cam in the unlocked position and the base plates squeezed together to allow for insertion of the hooks into channel.
Figure 2B:
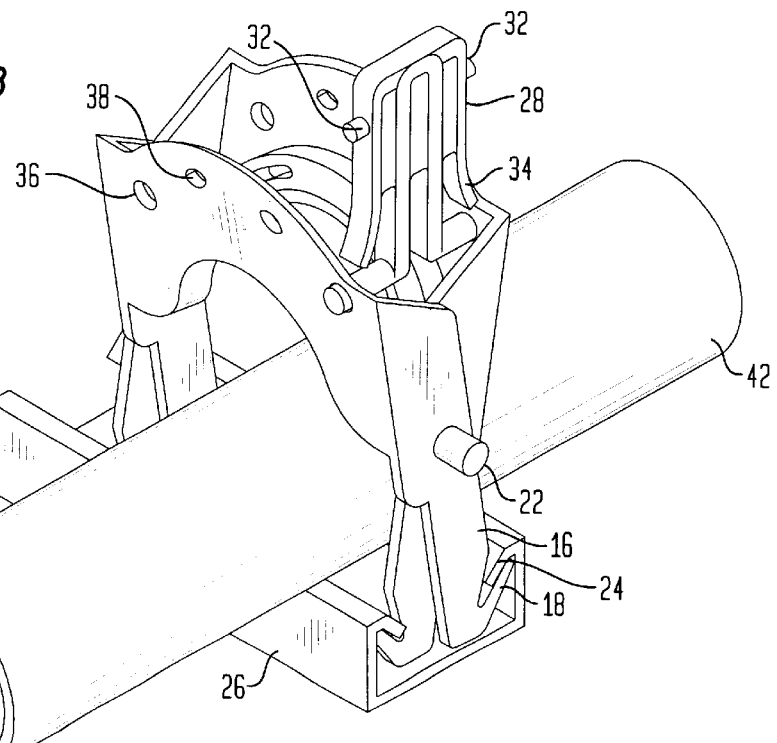
FIG. 2b illustrates the fully assembled apparatus of FIG. 1 with the cam in the unlocked position and the base plates released to allow the hooks to engage the inturned flanges of the channel.
Figure 3:
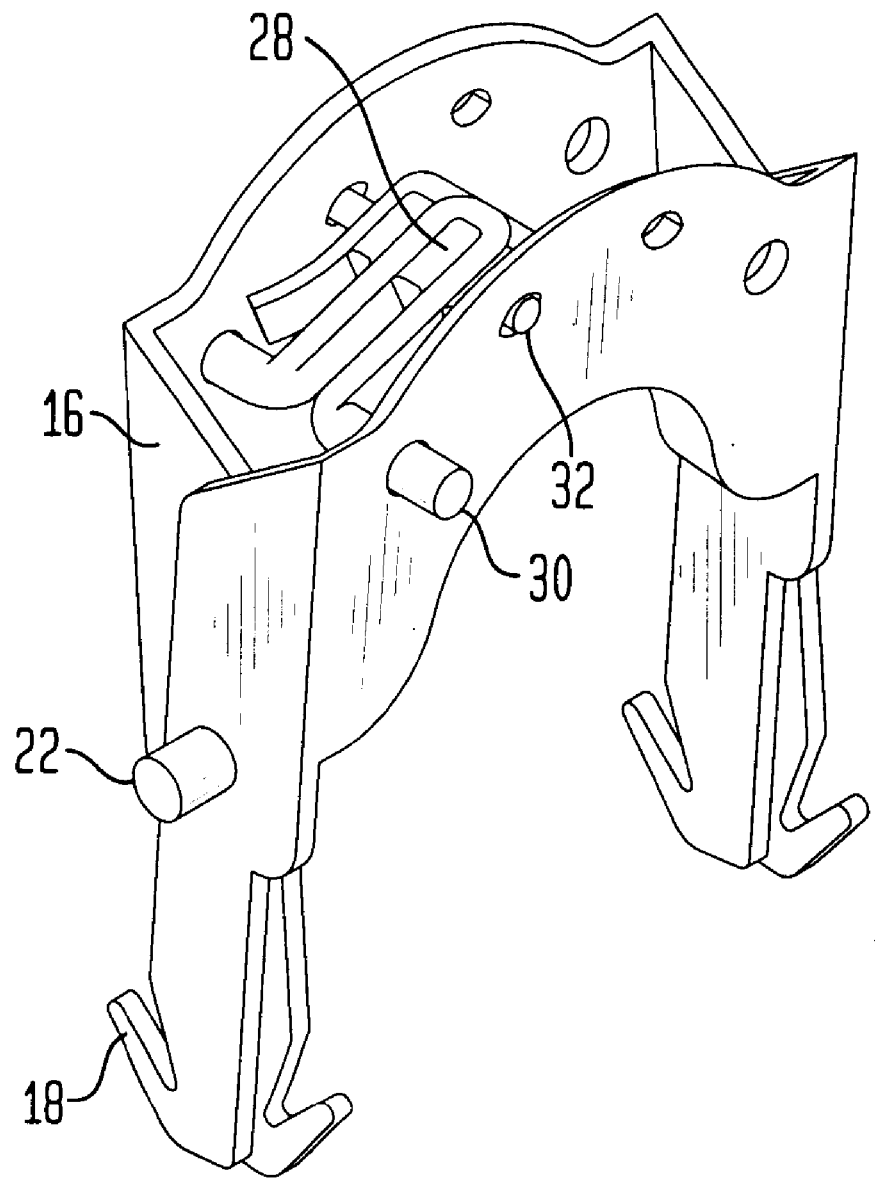
FIG. 3 illustrates the fully assembled apparatus of FIG. 1 with the cam in the locked position.

FIG. 1a illustrates the preferred embodiment of the present invention. FIG. 1b is an exploded view of a pipe attaching apparatus 10 of FIG. 1a. Each of two opposing U-shaped clamp halves 12 has a base plate 14 and two perpendicularly attached side arms 16 as illustrated in FIG. 1b. Each side arm 16 has a hook 18 located at the end of the side arm 16 opposite the base plate 14, and extending away from the base plate 14. Each side arm 16 has a hole 20 proximate midpoint which accommodates a pivot pin 22. Adjacent midpoints of the arms 16 on the oppositely disposed clamp halves 12 are secured by a pair of pins 22 as illustrated in FIG. 1b. Hooks 18 are adapted to engage inturned flanges 24 of a support channel 26 as shown in FIGS. 2a and 2b. Pipe attaching apparatus 10 has a cam 28, which allows for flexing and locking the clamp halves 12 relative to one another as illustrated in FIG. 2B. An elastically deformable axle 30 allows for insertion of the cam 28 into adjacent through holes 36 in the base plates 14. Two tension tabs 34 on cam 28 center the cam between the base plates 14 and allow the two clamp halves 12 to be flexed or moved relatively to one another. Two oppositely disposed lock pins 32 engage a pair of opposing holes 38 in base plates 14 and lock the apparatus 10 as shown in FIG. 3. Advantageously, a pair of shoes 40, are mounted on opposing flanges 44 on opposing base plates 12, by snapping into place to reduce noise and vibrations.

In actual practice, a pipe like member 42 is attached by placing the two U-shaped clamps over the pipe 42 with the cam 28 in the unlocked position as shown in FIG. 2a. The two base plates 14 are squeezed together, compressing the tension tabs 34, and moving hooks 18 on adjacent side arms 16 toward each other, allowing the hooks to be inserted between the flanges 24 of channel 26. When base plates 14 are released, tension tabs 34 push base plates 14 apart and rotate the clamp halves 12 so that hooks 18 engage the inturned flanges 24 of channel 26, as illustrated in FIG. 2b. Finally, cam 28 is pushed down toward pipe 42 until the lock pins 32 engage opposing holes 38 in base plates 14 to lock clamp halves 12 as shown in FIG. 3 and secure pipe 42. This operation can be accomplished by an experienced installer in 3–5 seconds with minimal force.

The apparatus of the present invention shown in FIGS. 1–4 is illustrated as securing a pipe 42 on top of support channel 26. It should be understood, however, that the support channel may be inverted, supporting pipe 42 beneath it. Support of a pipe by a vertically disposed or inclined channel is also envisioned.

The apparatus of the present invention shown in FIGS. 1–4 is illustrated with a single cam 28 in place, although through holes for a second cam are depicted. It is to be understood that the flexing and locking means of the present apparatus 10 can be provided by a plurality of such cams. The number will be a function of the size of the apparatus required to attach a given pipe.

The apparatus 10 of the present invention may be manufactured from materials such as stamped steel, injection-molded plastic or a combination of both. Shoes 40 are preferably made of plastic.

While the invention has been described with reference to a preferred embodiment thereof, it will be appreciated by those of ordinary skill in the art that modifications can be made to the structure and elements of the invention without departing from the spirit and scope of the invention as a whole.

What is claimed:

1. An apparatus for securing a tubular member to a support, said apparatus comprising:
    support means for engaging said apparatus and holding said tubular member relative to said apparatus, said support means comprising a channel with a C-shaped cross section having inturned flanges;
    securing means for engaging said support means and holding said apparatus relative to said support, said securing means comprising a pair of members connected pivotally mounted relative to one another about a common axis said pair of members comprising a pair of opposing clamp halves with a U-shaped cross section each having a base plate for holding said tubular member, and two side arms having hooks at the ends of said arms opposite said base plate, and extending away from said base plate for hooking over said inturned flanges of said channel;
    flex means for biasing said pair of members for movement relative to one another so that said pair of members can be engaged with said support means; and,
    locking means for fixing said pair of members in place relative to one another after said pair of members have been engaged with said support means,
        wherein said securing means may be engaged and disengaged from said support means by compressing said flex means such that said members pivot about said common axis.

2. The apparatus according to claim 1 wherein said flex means and said locking means comprise:
    a first pair of through holes arranged coaxially in one end of said base plates;
    a second pair of through holes arranged coaxially in the end of said base plates opposite said first set of through holes;
    a cam having a first end and a second end;
    said first end comprising an elastically deformable axle for inserting said cam into said first pair of through holes in said base plates of said clamp halves and allowing said axle to flex when said base plates are compressed; and,
    a second end comprising a pair of oppositely disposed lock pins for securing said second pair of through holes in said base plates of said clamp halves in position after said hooks have been engaged by said inturned flanges of said channel.

3. The apparatus of claim 2 further comprising a flange on said base plates such that the surface of said flange is parallel to the surface of said tubular member.

4. The apparatus of claim 3 further comprising a resilient shoe attached to the surface of said flange so as to rest on said surface of said tubular member.

5. The apparatus of claim 4 wherein said resilient shoe is made of plastic.

* * * * *